United States Patent
Gogolla et al.

(10) Patent No.: US 6,781,675 B2
(45) Date of Patent: Aug. 24, 2004

(54) ELECTRO-OPTICAL PARA-AXIAL DISTANCE MEASURING SYSTEM

(75) Inventors: Torsten Gogolla, Schellenberg (LI); Andreas Winter, Feldkirch (AT); Helmut Seifert, Serba (DE); Martin Penzold, Jena (DE); Gero Schusser, Buergel (DE); Dieter Schmidt, Gera (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/388,013

(22) Filed: Mar. 13, 2003

(65) Prior Publication Data

US 2003/0218737 A1 Nov. 27, 2003

(30) Foreign Application Priority Data

Mar. 18, 2002 (EP) .............................. 02405206

(51) Int. Cl.⁷ ............................ G01C 3/08; G03B 13/00
(52) U.S. Cl. ..................... 356/4.01; 396/106; 356/5.01; 356/5.1
(58) Field of Search ................. 396/106; 356/4.01–5.15

(56) References Cited

U.S. PATENT DOCUMENTS

| | | | |
|---|---|---|---|
| 4,313,654 A | * | 2/1982 | Matsui et al. |
| 4,345,827 A | * | 8/1982 | Stemme et al. |
| 4,403,857 A | | 9/1983 | Hölscher |
| 4,464,038 A | * | 8/1984 | Nanba |
| 4,876,446 A | | 10/1989 | Kambe |
| 5,812,893 A | * | 9/1998 | Hikita et al. |

FOREIGN PATENT DOCUMENTS

| | | |
|---|---|---|
| DE | 19513823 | 10/1996 |
| DE | 19860464 | 7/2000 |
| DE | 19855296 | 8/2000 |
| EP | 701702 | 2/1997 |
| EP | 801315 | 10/1997 |
| WO | WO9320458 | 10/1993 |

* cited by examiner

Primary Examiner—Stephen C. Buczinski
(74) Attorney, Agent, or Firm—Sidley Austin Brown & Wood, LLP (57) ABSTRACT

An electro-optical distance measuring system (1, 1') for large measurement ranges having a para-axial arrangement of a beam source (2) with a transmitting optics (3) and a beam receiver, configured as at least one small-area photodiode (4), with an associated receiving optics (5), which contains the processes for signal extension for the lower distance measurement range for distances (X). The beam source (2), the transmitting optics (3), the small-area photodiode (4) and the receiving optics (5) are each oriented with their optical axes (A1, A2) parallel to the measurement light beam (6). The measurement light beam (6) is directed from the transmitting optics (2) to the measurement object and continues to the receiving optics. The beam source (2) and the small-area photodiode (4) are connected rigidly with each other by at least one rigidly connected circuit board (8, 8a, 8b), such that at least the small-area photodiode (4) can electrically conduct and temporarily adjust in a position (9, 9') at least using its electrical contacts (10). The small-area photodiode (4) is fixed directly in the adjusted position (9, 9') on the circuit board (8, 8a, 8b).

8 Claims, 5 Drawing Sheets

Fig. 2

Fig. 3 (III-III)

ELECTRO-OPTICAL PARA-AXIAL DISTANCE MEASURING SYSTEM

BACKGROUND OF THE INVENTION

The invention relates to an electro-optical distance measuring system for large measurement ranges with parallel spaced arrangement of the optical transmitting and receiving axes, in para-axial arrangement, as an easy-to-use distance measuring device.

One such electro-optical distance measuring system, as described in U.S. Pat. No. 4,403,857, for example, features in addition to the computing and input/output unit, a phase and echo time measurement and a reference photo diode, particularly a beam source with transmitting optics and a separate beam receiver with receiving optics, whose optical axes are each oriented parallel to the measuring beam. The primary light beam leaving the beam source is, after collimating in a collimating lens, split into a measurement light beam and a reference light beam that impinges on the reference photo diode. Conventionally, the beam source has transmitting optics and a beam receiver with receiving optics each as a structural unit. The measurement range limited by the dynamics range and the effective aperture of the beam receiver is, in distance measuring systems of such simple design principle, too small.

According to DE19513823, in an electro-optical coaxial distance measuring system, the beam source designed as a laser diode and the beam receiver are each electrically conducting fastened directly to a common, rigid circuit board with other electronic components and oriented vertically to each other. Additionally, upstream of the transmitting optics, reference light beam output coupling of the primary light beam is at a reference photodiode. There is no para-axial arrangement of the optical transmitting and receiving axis, whereby additional beam deflection means such as deflection mirrors are required.

According to DE19855296, a large-area photodiode not requiring adjustment is used as the beam receiver. In use, large-area photodiodes enable only a small measurement range due to interference effects such as external light, homogeneity defects on the active detector surface, dark current and interference reflections from the local environment and on smaller limited measurement frequencies, e.g. 500 MHz. In addition, they have a comparatively high measurement error and require long measuring times.

According to DE 19860464, a manual laser distance measuring device for the large measuring ranges of from 0.30 m to 30 m common in the construction trade features in the focal point of the receiving optics a small-area photodiode for minimizing interference effects and modified receiving optics with an addition secondary focal point offset at an angle for the image, which is offset by the para-axial arrangement, of a measurement object situated in the near range. Essential to this solution is that the modified receiving optics features precisely two focal points on the image side, which arise in that the receiving lens consists of a primary lens region and a secondary lens region, wherein the secondary lens region runs, extended over the entire diameter of the receiving lens, vertical to the transmitting axis and has a trapezoidal shape, which becomes narrower towards the transmitting axis. The two lens regions are dimensioned so that over the entire desired distance range a reflex signal lying within its sensitivity range is received by the beam receiver.

The purpose of a highly sensitive distance measuring device is minimization of the interference effects limiting the measurement range, in particular those interference effects that are produced by detected foreign light. For reducing impingement of foreign light either small detector surfaces and/or large focal distances of the receiving optics can be used. When such an arrangement is used, the ratio of detector diameter to focal distance has a decisive role. The smaller the ratio, the less interfering foreign light is detected. In non-circular area active detector surfaces or in arrangements with a plurality of detector surfaces one refers to diameter in the following, whereby a circular area of equivalent detector diameter is meant. A small ratio of equivalent detector diameter to focal distance of the receiving optics makes the configuration and particularly the photodiode relative to the receiving optics and the measurement light beam, needful of adjustment. Such adjustment, which usually, for example, according to EP701702, is made possible by mechanically adjustable beam adjustment systems in the measurement path such as a light guide fiber, which represents potential sources of error in the rough construction industry.

During the adjustment procedure, the laser measurement device and conventional adjustment auxiliary means is adjusted, in the presence of an activated measurement light beam, to the optimal beam path. For the purpose of simplified description, reference will be made in the following to a small-area photodiode, wherein the small ratio of equivalent detector diameter to focal distance to the receiver optics is meant. Measures for signal extension for the lower distance measuring range are required since configurations with a small ratio of detector diameter to focal distance tend towards a strong lateral offset of the imaged light spot so that in short distances, under certain circumstances, no light reaches the photosensitive surface.

The measures are either the use of additional elements in the receiver beam path, which as in the device of DE 19860464, generate an additional secondary focal point or deflection elements, and as in the device of EP 701702, which guide the light from the near range to the active detector surface. Likewise, moveable active deflector surfaces, as in the device of EP 701702, can be used. Another measure is the use of at least one second active detector surface, which especially detects light from the near range. A slit-like active detector surface is also possible, wherein decreasing distance parts of the imaged measurement light beam run along the slit. All measures described are characterized in the description as measures for signal extension for the lower distance measurement range.

SUMMARY OF THE INVENTION

The object of the invention is to provide a robust adjustable, para-axial distance measuring device for large measurement ranges. A further object is that the adjustment procedure should require the shortest possible time and should be easy to automate. Additional beam deflection systems or beam adjustment systems such as deflecting mirrors and mechanical devices for tilting and offsetting should be eliminated. Such an arrangement results in a reduction of costs and in increased reliability of the distance measuring device because of the reduced component requirement.

This object is achieved, in accordance with the invention, by an electro-optical distance measuring system for large measuring ranges having a para-axial arrangement of a beam source with transmitting optics and a beam receiver, designed as at least one small-area photodiode, with receiving optics, which contains processing for signal extension for the lower distance measuring range. The beam source, the transmitting optics, the receiving optics and the beam receiver are each oriented parallel to the measurement light beam. The measurement light beam reaches directly; that is, without beam deflection devices or beam adjustment devices, through a protective window, through the transmitting optics to the measurement object and to the receiving optics. The beam source and the small-area photodiode are rigidly connected with each other by at least one intrinsically rigid connected circuit board. At least the small-area photodiode electrically conducts and temporarily adjusts to the position using its electrical contacts and, optionally, using its housing fixed directly to the adjusted position on the circuit board.

A robust para-axial distance measuring system is realized as result and, temporarily during the adjustment process, is adjustable in the position of the small-area photodiode with respect to the receiving optics, for example, by an enlarged adjustment gap between the contacts of the photodiode and the circuit board and/or enlarged contact surfaces on the circuit board.

Advantageously, the beam source electrically conducts and temporarily adjusts to the position using its electrical contacts and, optionally, using its housing fixed directly in the adjusted position on the circuit board, whereby temporarily during the adjusting process the position of the beam source is adjustable relative to the transmitting optics, which preferably are designed as collimating optics.

Advantageously, a beam source module, which connects the beam source rigidly to the transmitting optics, is fixed with the electrical contacts of the beam sources and, optionally, using the housing of the beam source, on a circuit board shared with the small-area photodiode, wherein the beam source module itself is pre-adjustable.

Advantageously, the laser distance measuring device features a rigid optics carrier, on which both the transmitting optics or the beam source module and the receiving optics are fixed, whereby a para-axial arrangement of the transmitting optics and the receiving optics is realizable in a technologically simple fashion.

Advantageously, the at least one circuit board is rigidly connected with the optics carrier using fastening means such as screws, rivets or adhesive, whereby a robust, rigid arrangement of the beam source with the associated transmitting optics and/or the beam receiver with the associated receiving optics is established by the optics carrier and the circuit board.

Advantageously, the beam source and the small-area photodiode and a circuit board, which are connected with the rigid optics carrier, are fixed directly using their respective electrical contacts and, optionally, using their respective housings, in a respective adjusted position, whereby the respective transmitting module and the receiving module having the additionally required electronic components can be prefabricated separately on separate circuit boards.

Advantageously, the beam source fixed directly on the circuit board, in position in the direction of the beam, using the electrical contacts and, optionally, using the housing is friction locking introduced into the rigid optics carrier and fixed on the circuit board shared with the small-area photodiode, whereby during the adjustment process with the activated beam source, the position of the beam source is temporarily adjustable with respect to the transmitting optics, in the direction of its optical axis.

Advantageously, the beam source module is connected rigidly with the rigid optics carrier and bonded on the circuit board sing the electrical contacts of the beam source, wherein a pre-adjusted beam source module can be used.

Advantageously, the focal distance of the receiving optics is less than 40 mm; also advantageously, the focal distance of the receiving optics is less than 25 mm, whereby, mediated by the strong refractory power, even angularity offset portions of the measurement beam reflected in the near range reach the small-area photodiode. In addition, the receiving optics can be combined with a color filter corresponding to the wavelength of the measurement light beam.

Advantageously, the ratio of the equivalent detector diameter to the focal distance of the receiving optics is less than 0.005, preferably less than 0.001, whereby a high resistance to interference, particularly relative to foreign light and parasitic reflection from the near range or local environment, is achieved.

Advantageously, the small-area photodiode has an active surface in the diameter of less than 100 $\mu$m, preferably less than 30 $\mu$m, whereby a high degree of resistance to interference, in particular, relative to foreign light, parasitic reflection from the near range or local environment, homogeneity defects on the photosensitive surface and dark current, is achieved.

Advantageously, the small-area photodiode is configured as a large-area photodiode with an associated mask, which is advantageously configured as an opaque applied layer shielding the active surface, having at least one aperture opening, whereby a defined dimension and positioning of the active surface of the small-area photodiode can be easily established.

Advantageously, other active surfaces, by additional aperture openings of the mask or additional small-area photodiodes are arranged para-axially offset to the first active surface, whereby angularity offset portions of the measurement light beam reflected in the near range with defined intensity reach at least one active surface.

Advantageously, the small-surface photodiode or the aperture opening of the mask is delimited slitlike in one dimension such that with decreasing distance, parts of the imaged measurement light beam run along the longitudinal active surface, whereby angularity offset portions of the measurement light beam reflected in the near range with defined intensity reach the active surface.

Advantageously, the small-area photodiode is configured as an SMD photodiode, whereby miniaturization and cost effectiveness are favored.

Advantageously, a reference photodiode is provided, on which a reference light beam deflected from a primary light beam impinges, whereby an internal calibration of distance measuring is possible.

Advantageously, a reflection means is arranged between the beam source and the transmitting optics for providing reference light beam output coupling and which reflects or deflects a portion of the primary beam as a reference light beam to the photodiode or to a reference photodiode, whereby local homogeneity defects in the reference light beam can be avoided, which, caused by the laws of Fourier optics, are possible in a reference light beam output coupling downstream of the transmitting optics.

Advantageously, the reflection means is an exclusively diffusely reflecting diffusion body arranged in a radial marginal zone of the divergent primary beam exiting from the beam source, said diffusion body being designed as a diffusion contour of the optics carrier projecting into the diverging primary beam or as a diffusion spot on the diffusion mounting around the transmitting optics, which is technically simple.

In the associated adjustment process in the combined distance measuring system combined with the usual optical adjustment aids, for example a camera arranged at optical infinity, with activated measurement light beam at least the small-area photodiode, preferably by a manipulator controlled by a feedback loop at an automatically adjusted adjustment target value, is in a first step shifted relative to the circuit board so that a measurement light beam reflected or back-scattered into infinity impinges on a predefined zone of the small-area photodiode and, in a second step, the small-area photodiode is fixed using its electrical contacts electrically conducting directly, e.g. using soft solder or conducting adhesive, to an adjusted position on the circuit board. By doing this, the distance measuring system can be automatically adjusted as a unit.

The advantage of this adjustment method is that only one component must be adjusted, whereby adjustment without tilting is sufficient. In connection with the adjustment, only one stable, position-holding mechanical connection is required. The process is thus easily automated. The adjustment of the small-area photodiode can be done both manually and automatically using a manipulator with a robot and image processing.

Advantageously, the beam source is shifted, in the associated adjustment process with an activated measurement light beam, into a predefined first collimating adjustment step relative to the circuit board so that the measurement light beam is focussed in infinity and in a predefined collimating adjustment step the beam source is electrically conductive directly fixed to an adjusted position on the circuit board, using its electrical contacts, or using soft solder or conductive adhesive. As a result, the collimator can be automatically separately adjusted. Preferably, the beam source is shifted by using a manipulator controlled automatically to an adjustment target value by a feedback loop.

SUMMARY OF THE INVENTION

An exemplary embodiment of the invention will be more completely described below with reference to the drawings, wherein.

DETAILED DESCRIPTION OF THE INVENTION

Figure 1:
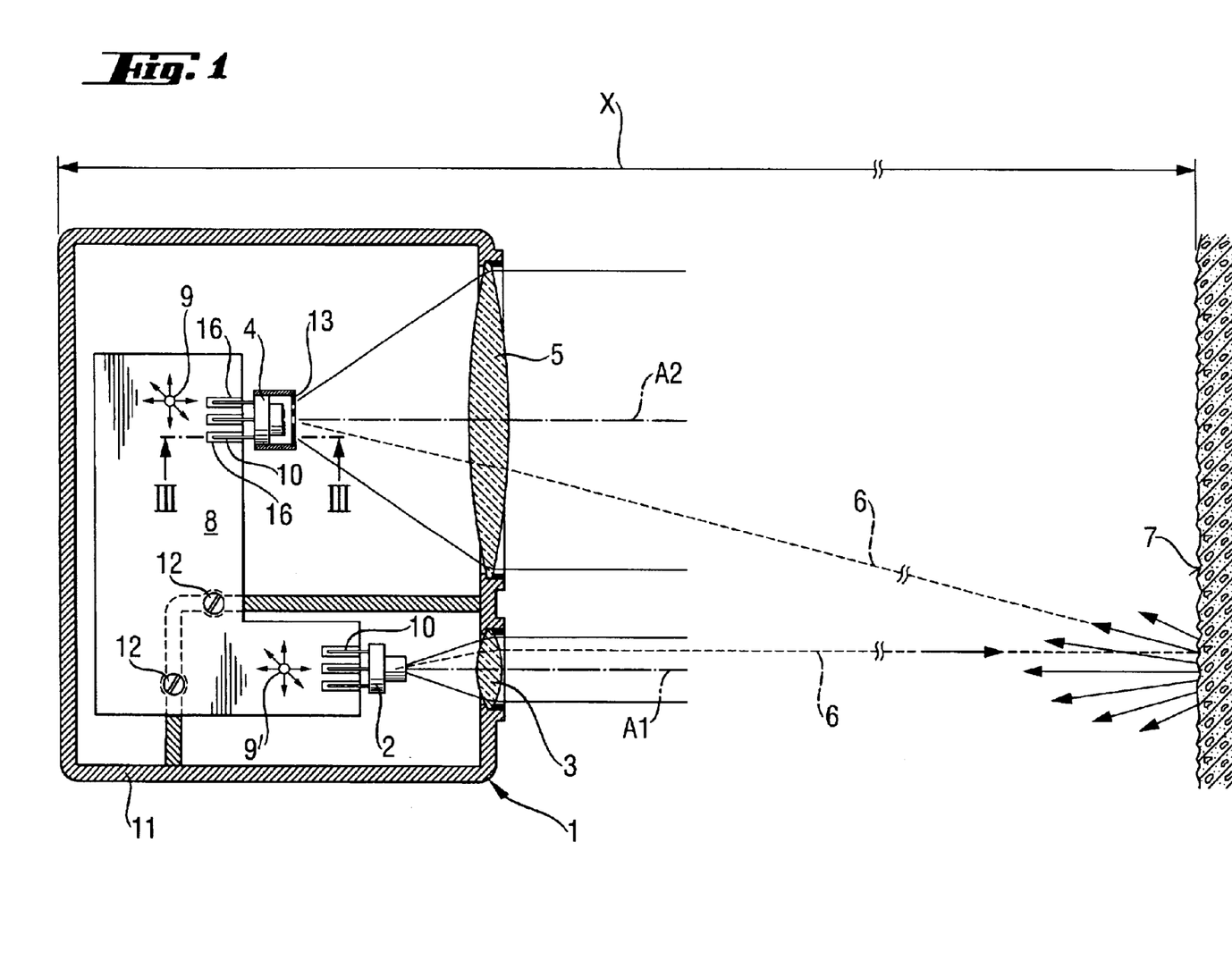
FIG. 1 shows a distance measuring system in accordance with the invention.

FIG. 1 shows an electro-optical distance measuring system 1 designed as a laser distance measuring device featuring a para-axial arrangement of a beam source 2 with transmitting optics 3 and a beam receiver configured as at least one small area photodiode 4 with receiving optics 5 having a short focal distance, which contains the operations for signal extension for the lower distance measuring range. A measurement light beam 6 reaches a measurement object 7 directly from the transmitting optics 3 and continues to the receiving optics 5. The beam source 2, the transmitting optics 3, the small-area photodiode 4 and the receiving optics 5 are oriented with their optical axes A1 and A2 each parallel to the measurement light beam 6, which from the transmitting optics 3 directly reaches the measurement object 7 and continues to the receiving optics 5. The beam source 2 and the small-area photodiode 4 are connected with each other rigidly by a common circuit board 8, itself rigidly designed, whereby the small-area photodiode 4 and the beam source 2 are fixed electrically conducting and temporarily in positions 9, 9', adjustable by their electrical contacts 10 directly on the adjusted position 9, 9' on the circuit board. The distance measuring system 1 features a rigid optics carrier 11, on which both the transmitting optics 3 and the receiving optics 5 are mounted. The circuit board 8 is rigidly connected to the optics carrier 11 by releasable fastening means 12 configured as screws. Different distances X are each assigned different aperture openings by a mask 13 of the photodiode 4 with two para-axially offset aperture openings for a first active surface and a second active surface, which are designed for different distances X.

Figure 2:
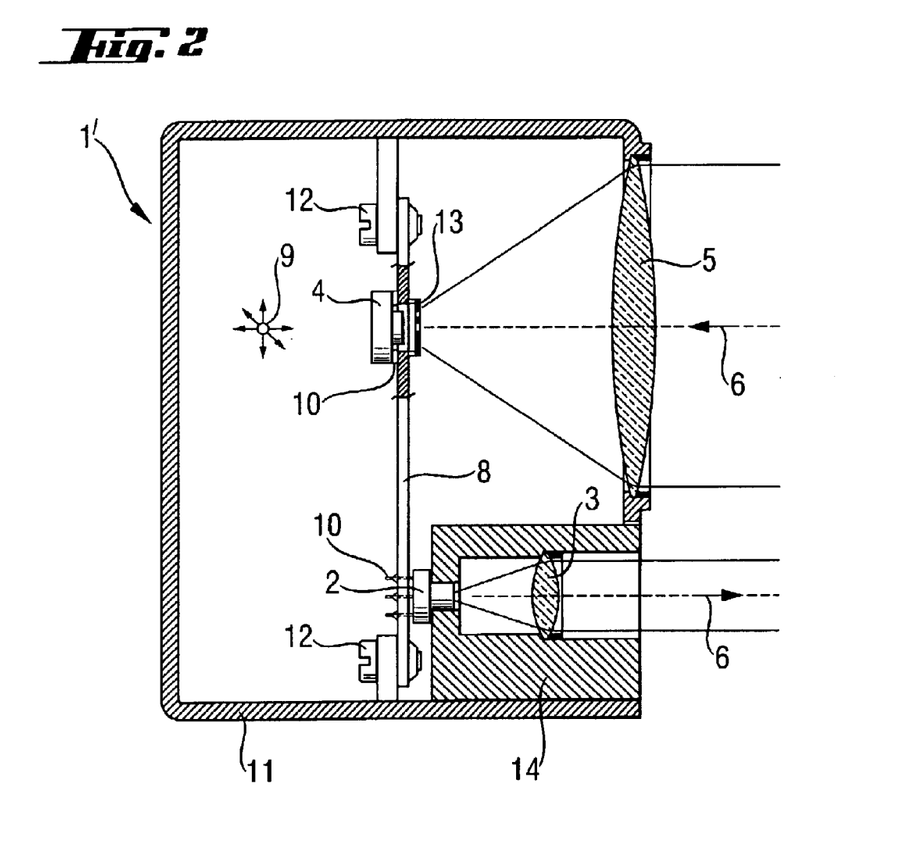
FIG. 2 shows a variant of the system of FIG. 1.
Figure 2A:
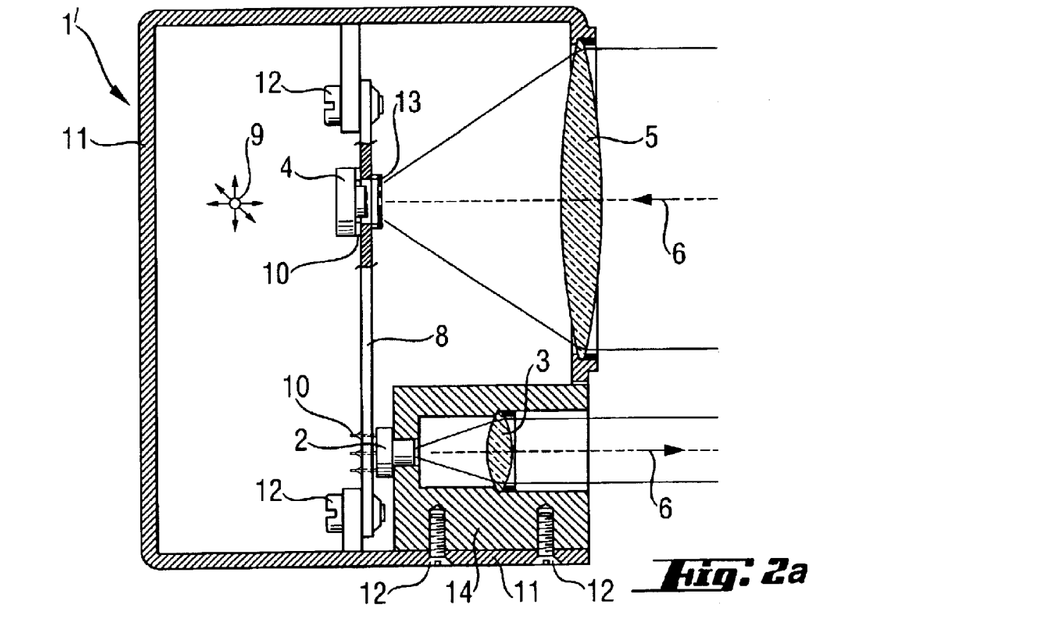
FIG. 2a shows a variant of the system of FIG. 2.
Figure 2B:
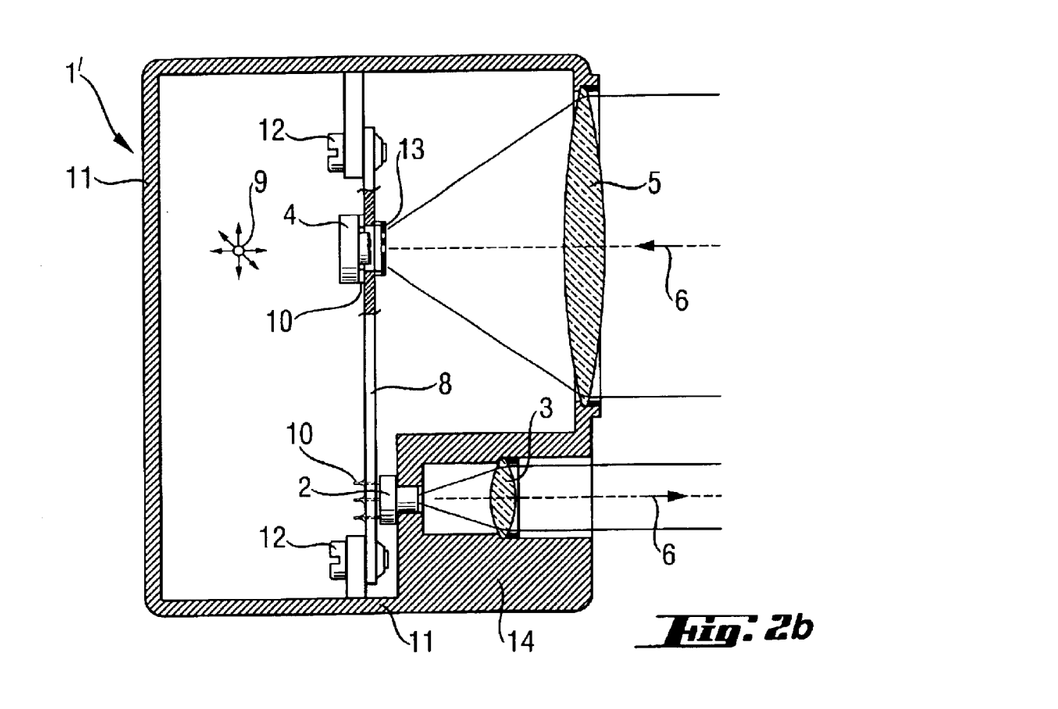
FIG. 2b shows another variant of the system of FIG. 2

FIG. 2 shows a variant of the distance measuring system 1', wherein a beam source module 14, which rigidly connects the beam source 2 with the transmitting optics 3, is fixed by the electrical contacts 10 of the beam source 2 on the circuit board 8 rigidly to the carrier 11 using fastening means 12, at which the small area photodiode 4 configured as an SMD photodiode, shielded by the mask 13, is electrically and temporarily adjustable in position 9 via its electrical contacts 10 and via its housing fixed directly at the adjusted position 9. In a further variant of the distance-measuring system 1', explained using FIG. 2a with minor modifications, a beam source module 14, which directly connects the beam source 2 with the transmitting optics 3, is fixed using fastening means 12 to the optics carrier 11 and fixed, by the electrical contacts 10 of the beam source 2 and by the housing of the beam source 2, to the circuit board 8 that is fixed by fastening means 12 to the optics carrier 11, on which, in addition the small-area photodiode 4, which is shielded by the mask 13 and designed as an SMD photodiode, is adjustably fixed by its electrical contacts 10 and further by its housing directly in the position 9. In a further variant of the distance measuring system 1', explained using FIG. 2b with minor modifications, the beam source module 14 is incorporated into the optics carrier 11 (that is, it is part of the optics carrier 11), which directly connects the beam source 2 with the transmitting optics 3. The beam source 2 is friction locking introduced into the optics carrier and rigidly fixed by fastening means 12 on the circuit board 8 that is fastened to the optics carrier 11 by the electrical contacts 10 of the beam source 2 and by the housing of the beam source 2, at which the small-area photodiode 4, shielded by the mask 13 and designed as an SMD photodiode, is adjustable electrically conducting and temporarily in position 9 and additionally fixed by its electrical contacts 10 and further by its housing in the adjustable position 9.

Figure 3:
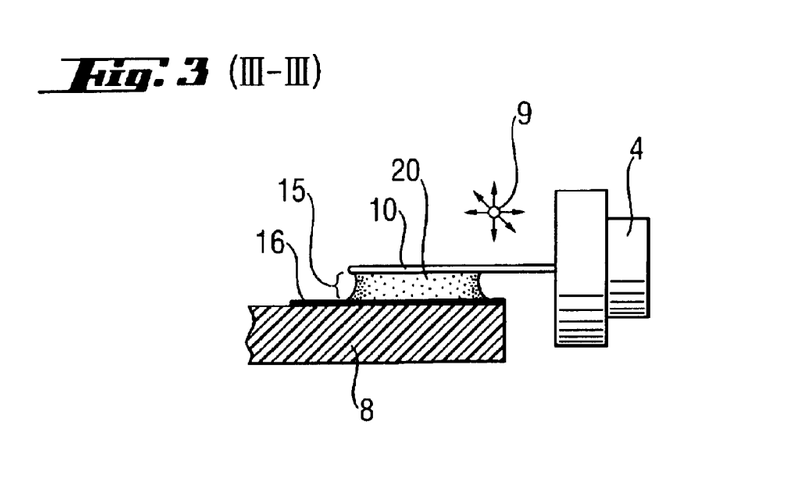
FIG. 3 shows a detail drawing of the system, of FIG. 1, enlarged, and sectioned on plane III—III of FIG. 1.

FIG. 3 shows the contacts 10 of the small-area photodiode 4 arranged by an adjustment gap 15 that can be bridged using soft solder joint 20 or conductive adhesive along the enlarged contact surfaces 15 of the circuit board 8.

Figure 4A:
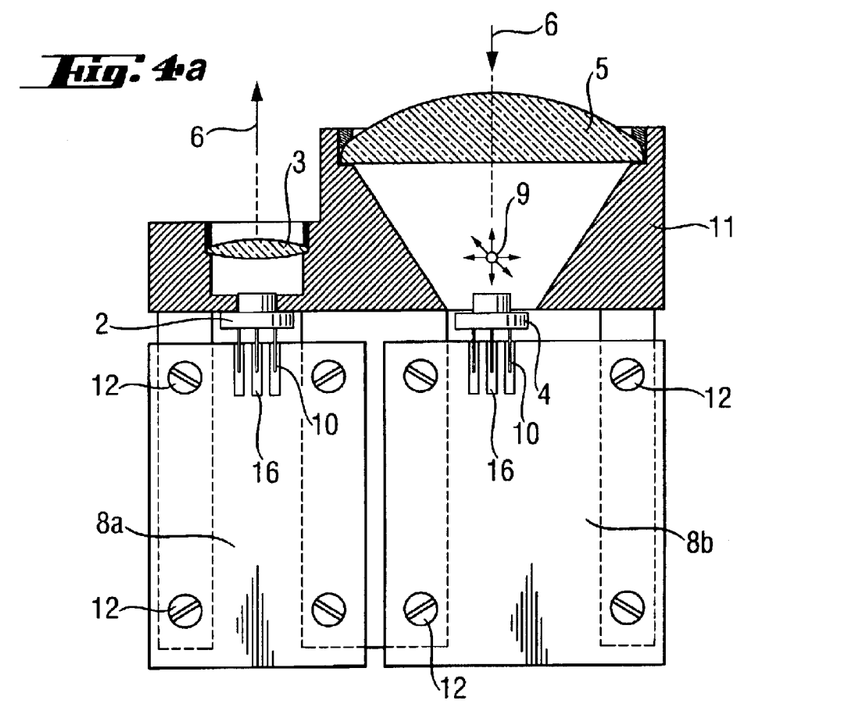
FIG. 4a shows a fastening variants.
Figure 4B:
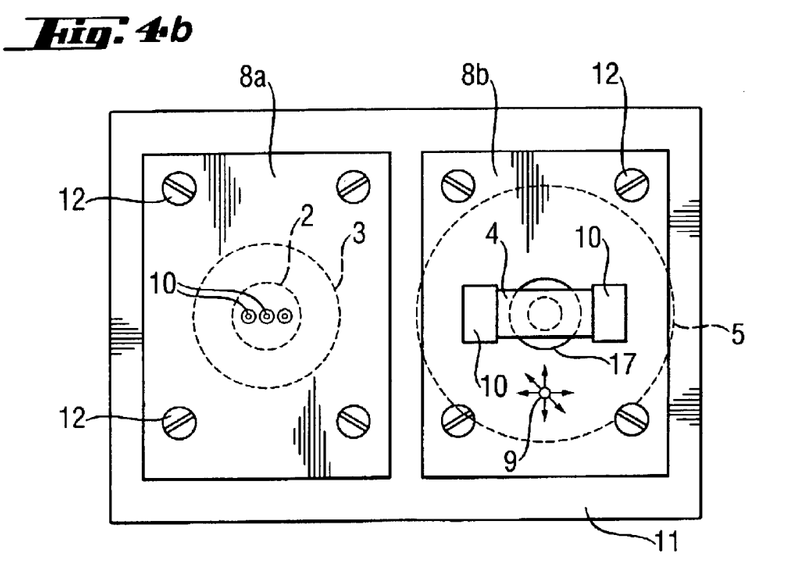
FIG. 4b shows another fastening variants.
Figure 5:
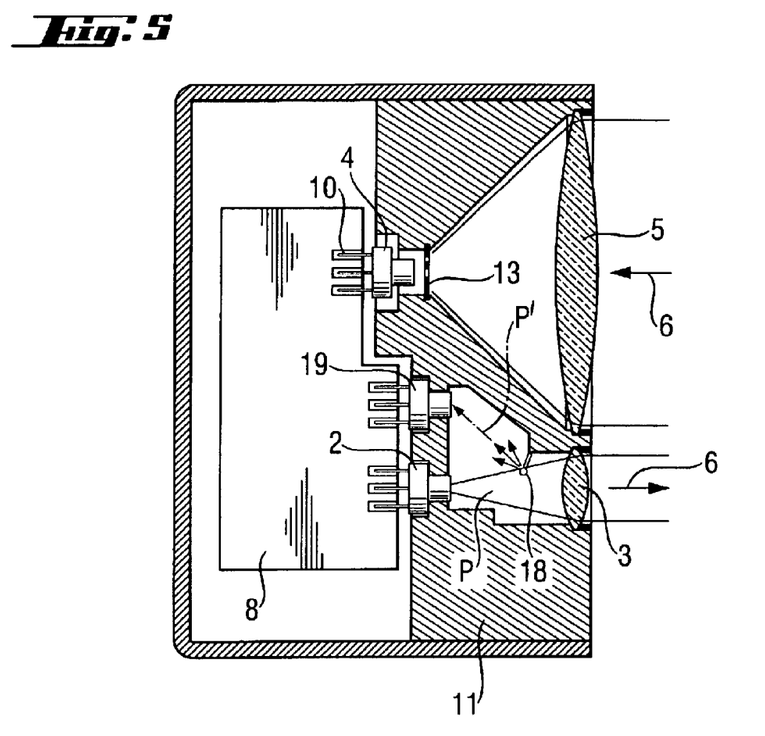
FIG. 5 shows a variant of the system with reference photo diode.

FIGS. 4a and 4b show different fastening variations of the circuit board 8 to the optics carrier 11. According to FIG. 4a, two individual circuit boards 8a, 8b are arranged with their surfaces vertical, relative to the optical axes, parallel orientation of the beam source 2, the transmitting optics 3, the small-area photodiode 4 and the receiving optics 5, which are associated with the transmitting module (2, 3) and the receiving module (4, 5), are rigidly connected by fastening means 12 to the optics carrier 11 and also with each other. According to FIG. 4a, two individual circuit boards 8a, 8b are arranged with their surfaces vertical, relative to the optical axes, parallel orientation of the beam source 2, the small-area photodiode 4, which are associated with the transmitting module (2, 3) and the receiving module (4, 5), are rigidly connected by fastening means 12 to the optics carrier 11 and also with each other. The small-area photodiode 4 configured as an SMD photodiode, is arranged behind a bore hole 17 passing through the circuit board 8b and electrically and temporarily adjustably connected with it by its contacts 10. FIG. 5 shows a reflecting means 18 facing the reference light beam output coupling between the beam source 2 and the transmitting optics 3, which projects exclusively into a radial marginal area of the strongly diffusing primary beam P from the beam source 2 and reflects a portion of the primary beam P, as the reference light beam P', directly through a transparent open space in the optics carrier 11 to a reference photo diode 19.

Figure 6:
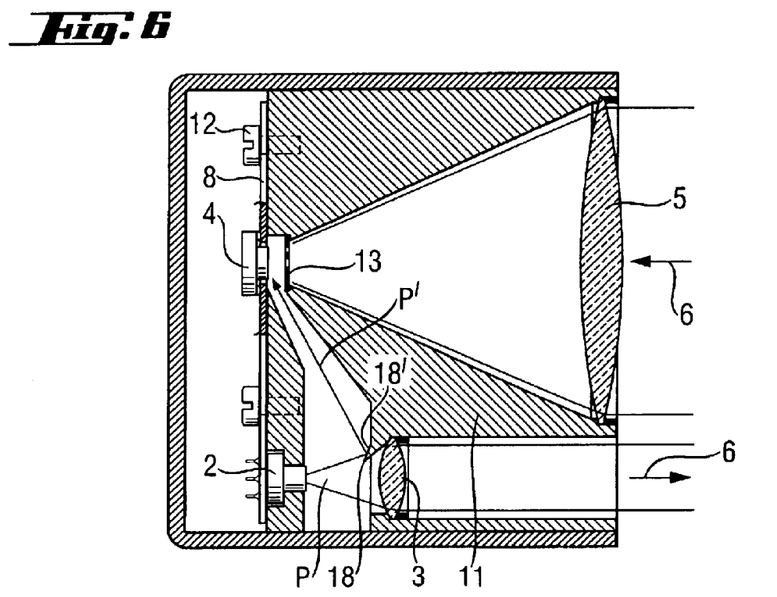
FIG. 6 shows a variant of the system without reference photo diode.

According to FIG. 6, the reflecting means 18 is configured as dispersion contour projecting exclusively in a radial margin area into the strongly diffusing primary beam P and reflects a portion of the primary beam P as the reference light beam P' through a transparent open space in the optics carrier 11 to the small-area photodiode 4, towards the reference light beam output coupling.

In a preferred embodiment of the adjusting means, the beam source 2 is preparatory inserted friction locking to the stop into the optics carrier 11, the circuit board 8 is fixed to the optics carrier 11 by the fastening means 12 and the beam source 2 with its electrical contacts and, optionally, with its housing is bonded and fixed to the circuit board 8. For beam collimating, the transmitting optics 3 is adjusted with activated beam source 2 in the direction of its optical axis and bonded such that a collimated measurement laser beam results and the receiving optics 5 is bonded against the optics carrier 11. Then with an activated measurement light beam 6, using a manipulator, the small-area photodiode 4 gripped with a clamp is displaced so that the focus of the diffused light of the laser light spot coming from infinity, which is formed on a surface at a great distance by a measurement light beam 6 created as a laser beam, impinges on a certain position of the active surface of the small-area photodiode 4 associated with the remote area. After adjustment, the small-area photodiode 4 is fixed, via its electrical contacts 10, to the adjusted position 9 on the circuit board 8 using a solder bond. In the process, adjustment tolerances are compensated by adjustment gaps 15 using solder bridges (soft solder 20) and enlarged contact surfaces 16. The direct fixation of the small-area photodiode 4 on the circuit board 8 is used as a stable mechanical mounting as well as an electrical contact, whereby no additional mounting elements are used for the small-area photodiode in the optics carrier 11.

What is claimed is:

1. An electro-optical distance measuring system for large measurement ranges having a para-axial arrangement of a beam source (2) with an associated transmitting optics (3) and a beam receiver, configured as at least one small-area photodiode (4), with an associated receiving optics (5), including a means for signal extension for a lower distance measurement range for distances (X); wherein the small-area photodiode (4) features an active surface in the equivalent diameter of less than 100 $\mu$m; wherein the beam source (2), the transmitting optics (3), the small-area photodiode (4) and the receiving optics(5) are each oriented with their optical axes (A1, A2) parallel to a measurement light beam (6) and the measurement light beam (6) is directed from the transmitting optics (3) to the measurement object and to the receiving optics and wherein the beam source (2) and the small-area photodiode (4) are rigidly connected with each other by at least one rigidly connected circuit board (8, 8a, 8b), such that at least the small-area photodiode (4) is electrically conductible and temporarily adjustable in a position (9, 9') at least using electrical contacts (10) and is fixed directly in the adjusted position (9, 9') on the circuit board (8, 8a, 8b), wherein the small-area photodiode (4) is configured as a large-area photodiode with a mask (13) having at least one aperture opening, said mask limiting shielding the active surface.

2. An electro-optical distance measuring system for large measurement ranges having a para-axial arrangement of a beam source (2) with an associated transmitting optics (3) and a beam receiver, configured as at least one small-area photodiode (4), with an associated receiving optics (5), including a means for signal extension for a lower distance measurement range for distances (X): wherein the small-area photodiode (4) features an active surface in the equivalent diameter of less than 100 $\mu$m: wherein the beam source (2), the transmitting optics (3), the small-area photodiode (4) and the receiving optics(5) are each oriented with their optical axes (Al, A2) parallel to a measurement light beam (6) and the measurement light beam (6) is directed from the transmitting optics (3) to the measurement object and to the receiving optics and wherein the beam source (2) and the small-area photodiode (4) are rigidly connected with each other by at least one rigidly connected circuit board (8, 8a, 8b), such that at least the small-area photodiode (4) is electrically conductible and temporarily adjustable in a position (9, 9') at least using electrical contacts (10) and is fixed directly in the adjusted position (9, 9') on the circuit board (8, 8a, 8b), wherein a second active surface is arranged para-axially offset to a first active surface of the small-area photodiode (4).

3. An electro-optical distance measuring system for large measurement ranges having a para-axial arrangement of a beam source (2) with an associated transmitting optics (3) and a beam receiver, configured as at least one small-area photodiode (4), with an associated receiving optics (5), including a means for signal extension for a lower distance measurement range for distances (X): wherein the small-area photodiode (4) features an active surface in the equivalent diameter of less than 100 $\mu$m: wherein the beam source (2), the transmitting optics (3), the small-area photodiode (4) and the receiving optics(5) are each oriented with their optical axes (Al, A2) parallel to a measurement light beam (6) and the measurement light beam (6) is directed from the transmitting optics (3) to the measurement object and to the receiving optics and wherein the beam source (2) and the small-area photodiode (4) are rigidly connected with each other by at least one rigidly connected circuit board (8, 8a, 8b), such that at least the small-area photodiode (4) is electrically conductible and temporarily adjustable in a position (9, 9') at least using electrical contacts (10) and is fixed directly in the adjusted position (9, 9') on the circuit board (8, 8a, 8b), further comprises one reference photodiode (19).

4. The electro-optical distance measuring system of claim 3, wherein a reference light beam deflected from a primary light beam impinges on the one reference photodiode (19).

5. An electro-optical distance measuring system for large measurement ranges having a para-axial arrangement of a beam source (2) with an associated transmitting optics (3) and a beam receiver, configured as at least one small-area photodiode (4), with an associated receiving optics (5), including a means for signal extension for a lower distance measurement range for distances (X): wherein the small-area photodiode (4) features an active surface in the equivalent diameter of less than 100 μm: wherein the beam source (2), the transmitting optics (3), the small-area photodiode (4) and the receiving optics(S) are each oriented with their optical axes (A1, A2) parallel to a measurement light beam (6) and the measurement light beam (6) is directed from the transmitting optics (3) to the measurement object and to the receiving optics and wherein the beam source (2) and the small-area photodiode (4) are rigidly connected with each other by at least one rigidly connected circuit board (8, 8a, 8b), such that at least the small-area photodiode (4) is electrically conductible and temporarily adjustable in a position (9, 9') at least using electrical contacts (10) and is fixed directly in the adjusted position (9, 9') on the circuit board (8, 8a, 8b), wherein a reflecting means (18, 18') is arranged between the beam source (2) and the transmitting optics (3) for one of reflecting and scattering a part of the divergent primary beam (P) as a reference light beam (P') to one of a small-area photodiode (4) and a reference photodiode (19).

6. The electro-optical distance measuring system of claim 5, wherein the reflecting means (18) is configured as a diffusely reflecting diffusion body.

7. An electro-optical distance measuring system for large measurement ranges having a para-axial arrangement of a beam source (2) with an associated transmitting optics (3) and a beam receiver, configured as at least one small-area photodiode (4), with an associated receiving optics (5), including a means for signal extension for a lower distance measurement range for distances (X); wherein the small-area photodiode (4) features an active surface in the equivalent diameter of less than 100 μm: wherein the beam source (2), the transmitting optics (3), the small-area photodiode (4) and the receiving optics(5) are each oriented with their optical axes (A1, A2) parallel to a measurement light beam (6) and the measurement light beam (6) is directed from the transmitting optics (3) to the measurement object and to the receiving optics and wherein the beam source (2) and the small-area photodiode (4) are rigidly connected with each other by at least one rigidly connected circuit board (8, 8a, 8b), such that at least the small-area photodiode (4) is electrically conductible and temporarily adjustable in a position (9, 9') at least using electrical contacts (10) and is fixed directly in the adjusted position (9, 9') on the circuit board (8, 8a, 8b), wherein the small-area photodiode (4) is a large-area photodiode with a mask (13) having at least one aperture opening, said mask shielding the active surface and being applied as an opaque coating.

8. An electro-optical distance measuring system for large measurement ranges having a para-axial arrangement of a beam source (2) with an associated transmitting optics (3) and a beam receiver, configured as at least one small-area photodiode (4), with an associated receiving optics (5), including a means for signal extension for a lower distance measurement range for distances (X); wherein the small-area photodiode (4) features an active surface in the equivalent diameter of less than 100 μm: wherein the beam source (2), the transmitting optics (3), the small-area photodiode (4) and the receiving optics(5) are each oriented with their optical axes (A1, A2) parallel to a measurement light beam (6) and the measurement light beam (6) is directed from the transmitting optics (3) to the measurement object and to the receiving optics and wherein the beam source (2) and the small-area photodiode (4) are rigidly connected with each other by at least one rigidly connected circuit board (8, 8a, 8b), such that at least the small-area photodiode (4) is electrically conductible and temporarily adjustable in a position (9, 9') at least using electrical contacts (10) and is fixed directly in the adjusted position (9, 9') on the circuit board (8, 8a, 8b), wherein a second active surface is arranged para-axially offset to a first active surface of the small-area photodiode (4) using one of an additional aperture opening of the mask (13) and an additional small-area photodiode.

* * * * *